Sept. 29, 1931.  J. E. JOHANSSON  1,825,525
GAS GENERATING COMBUSTION ENGINE
Filed Oct. 12, 1925  2 Sheets-Sheet 1
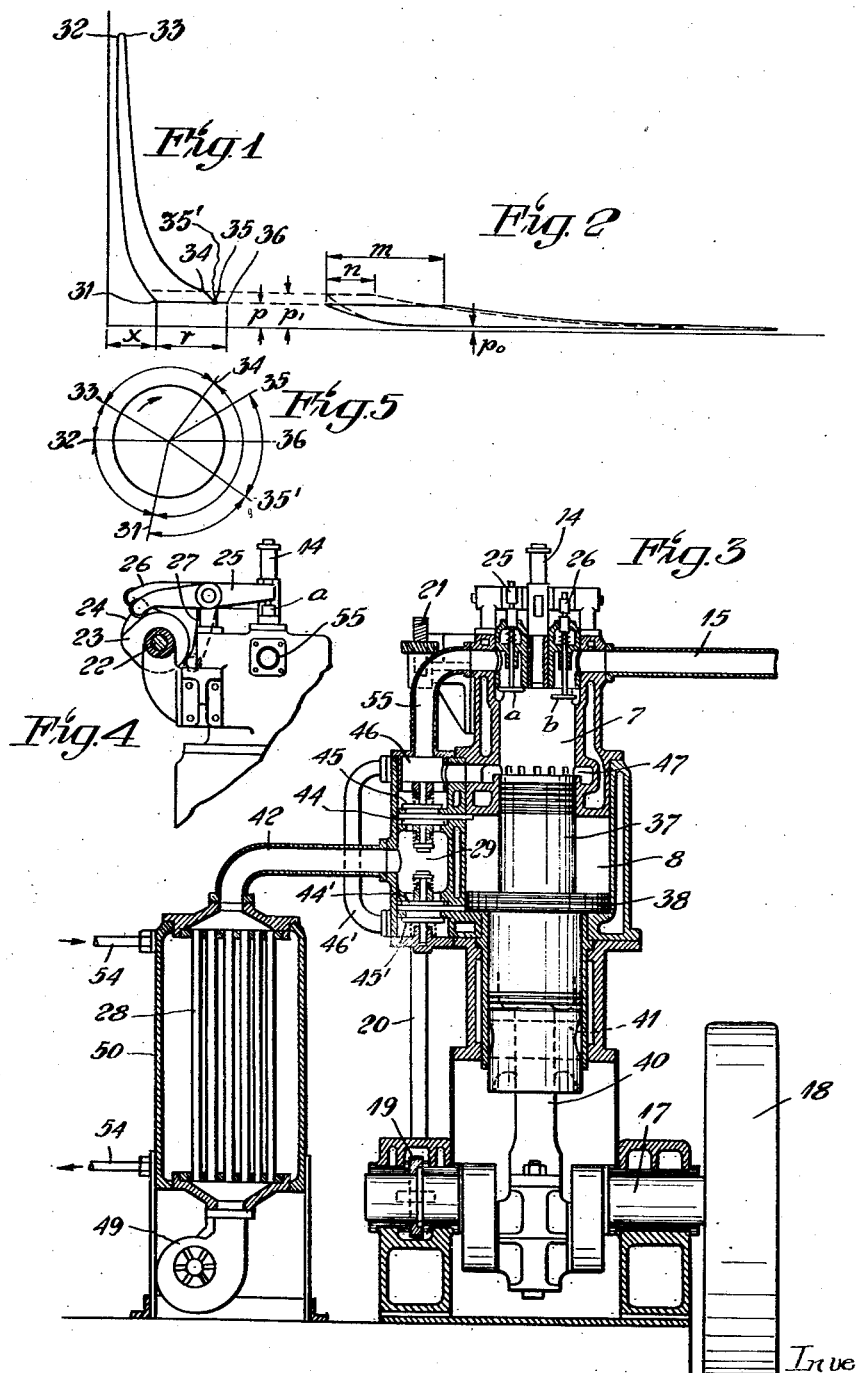
Inventor,
Johan Erik Johansson
By Brown, Boettcher + Dienner
Attys Patented Sept. 29, 1931

1,825,525

UNITED STATES PATENT OFFICE

JOHAN ERIK JOHANSSON, OF GOTTENBORG, SWEDEN, ASSIGNOR TO AKTIEBOLAGET GOTAVERKEN, OF GOTTENBORG, SWEDEN, A CORPORATION OF SWEDEN

GAS GENERATING COMBUSTION ENGINE

Application filed October 12, 1925, Serial No. 61,897, and in Sweden October 22, 1924.

My invention relates to gas engines and other explosive or internal combustion engines, particularly such engines which generate gas to be conveyed through pipes to and utilized in other engines at a distance from the gas generator plant.

The object of my invention is to construct a generator plant for generating a gas mixture suitable for the running of heat engines, comprising an internal combustion engine, preferably a two-stroke internal combustion piston engine and a compressor driven by the combustion engine and wholly or substantially consuming the available mechanical output of the engine, in which the expanded gases and the compressed air be mixed together in such a ratio that the produced gas mixture assumes such a temperature that it can be conveyed through pipes, preferably heat insulated pipes, to the distant place of consumption. For this purpose I make the stroke volume of the compressor of such a size as compared with the stroke volume of the internal combustion engine that the total quantity of air sucked by the compressor and which after being compressed to the required pressure is supplied to the working chamber of the internal combustion engine during the exhaust period is at least 50% larger than the quantity of the same air which will remain as charging air in the working chamber of the engine, whereby all the air is introduced in the cylinder of the combustion engine. I further use a gear for operating the exhaust valve to open at the end of the expansion stroke at a pressure approximately the same as the pressure of the gas mixture in order to avoid losses through drop in the pressure.

My invention will be better understood if I refer to the accompanying drawings, in which Fig. 1 is a diagram for the combustion engine, Fig. 2 is a diagram for the compressor, Fig. 3 is a vertical longitudinal sectional view of a gas generator according to one form of embodiment of the invention.

Fig. 4 is a detail view of the appertaining valve mechanism.

Fig. 5 is a crank diagram corresponding to the diagram shown in Fig. 1.

Figure 6:
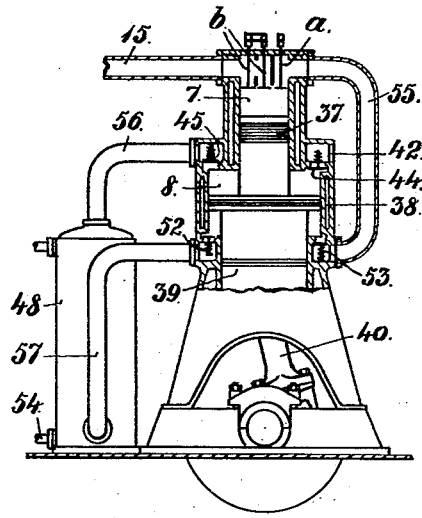
Figs. 6 to 8 show three further embodiments of the invention.

The diagram in Fig. 1 exemplifies the progress in a two-stroke internal combustion engine of Diesel type working according to this invention. 31—32 is the compression curve, 32—33 the combustion curve, 33—34 the expansion curve, 34—35 a small pre-exhaust and drop of pressure possibly occurring, 35—36—31 scavenging and pushing out the gas mixture.

The compressor-diagram in Fig. 2 represents the work corresponding to the work generated by the combustion engine according to the diagram in Fig. 1 after deducting the total friction losses of the plant. The quantity of compressor—air of the pressure $p$, which is introduced in the engine cylinder during the scavenging and pushing out period 35—36—31, is represented by the volume $m$ in Fig. 2. If the gas pressure should be raised to say $p'$, it is obvious that the area of diagram for the combustion engine and for the compressor becomes altered according to the dotted lines in Figs. 1 and 2, resulting in a decreased volume of air from the compressor equal to $n$, Fig. 2, and thus a higher temperature of the generated gas mixture.

In a generator plant according to this invention the volume of the generated gas mixture is equal to $m$ plus $r$, Figs. 1 and 2, without regarding the air possibly used for the fuel sprayer or atomizer.

The weight of this gas mixture M plus R is equal to $$\frac{\text{the volume } (m \text{ plus } r) \times \text{the pressure } p}{\text{abs. temp. of gas mixt. } T \times \text{gas const. } R}$$

$$\text{equals} \frac{(m \text{ plus } r) \cdot p}{T \cdot R}$$

if assumed that the gas-constant is the same for the air as for the expanded gas of the combustion engine, which can be done without appreciable fault. If further assumed that the weight of the introduced fuel, which amounts to a very small part of the charge of air, can be neglected as compared to the amount of the sucked in air, the weight of the obtained gas mixture is equal to the weight of the total amount of air sucked in by the plant, which is $$\frac{\text{the volume } m \times \text{the pressure } p}{\text{abs. temp. of the air } T_L \times \text{gas-const.} R} = \frac{m.p}{T_L.R}.$$

We therefore have:

$$\frac{(m \text{ plus } r)p}{T.R} = \frac{m.p}{T_L.R}$$

thus $$T = \frac{m \text{ plus } r}{m} T_L; \text{ or } T = \left(1 \text{ plus } \frac{r}{m}\right) T_L$$

The temperature T of the produced gas mixture is thus depending on the temperature T of the compressed air and on the ratio between $r$ and $m$. In order to make said temperature T a minimum for any assumed pressure $p$, $T_L$ must be made as low as possible and the ratio $$\frac{r}{m}$$

as small as possible. In other words, as the weight of the gas mixture is=

$$\frac{m.p}{T_L.R},$$

and this weight becomes larger for a smaller $T_L$, the weight of the compressed air has to be made a maximum. In order to obtain a large weight of the compressed air the compressor should receive as much power as possible from the generator, viz. the losses through friction, cooling, contraction in the valves, etc. in the plant should be made as small as possible, and furthermore, the temperature of the sucked in atmospheric air should be made low in order to lower the temperature $T_L$.

For obtaining a large weight of the compressed air the area of diagram in Fig. 2 should be made large, viz. the area of diagram of Fig. 1 should be made a maximum. Said diagram of Fig. 1 can be made larger if the initial combustion pressure at 32 could be increased. But an excessively high combustion pressure will cause an excessive piston pressure resulting in large dimensions of the various parts of the crank, etc. Therefore, the practical limit upward of said pressure will soon be reached and 1400 lbs. per square inch should not be exceeded. As a practical limit 850 lbs. can be considered.

As to the friction losses these are depending on the design of the combustion engine and the compressor. They can be limited by building these machines together, viz. designing the plant so that the same piston is used for both the combustion engine and the air compressor, and more particularly by making the compressor double-acting.

As to the cooling losses in the combustion engine these can be reduced if the combustion is allowed to take place with a surplus of air. Such a surplus is obtained automatically when using an ample amount of scavenging air.

In common two-stroke combustion engines an ample scavenging imports a considerable loss of energy. Such is not the case here, as the surplus only contributes to the lowering of the temperature of the generated gas without entailing any loss per se and also increases the surplus of air at the combustion.

In order to render it possible to conduct the gas mixture through pipes, as mentioned, the quantity of the compressed air supplied to the exhaust gases ought to be so large that the temperature of the generated gas mixture will lie between about 550 and 1100° F., and the air may preferably be cooled before being sucked into the compressor, so as to increase the weight of the air. The air may further be precompressed by a fan or the like before being conducted to the compressor for further compression.

Figure 7:
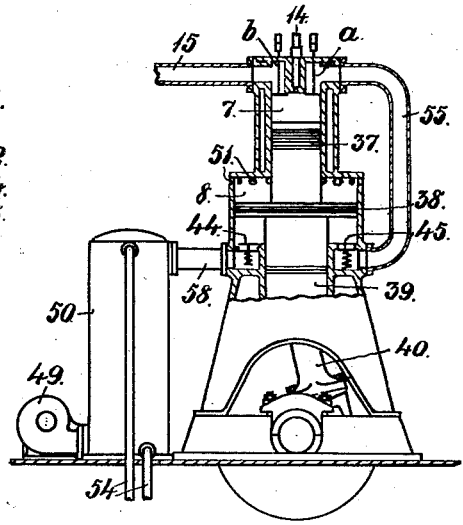

In the embodiment shown in Figs. 3 and 4, 7 designates the working cylinder of the internal combustion engine and 8 denotes the compressor cylinder, 38 being a double acting compressor piston adapted on both sides to compress air of the pressure $p_0$ to a pressure $p$ suitable for charging and scavenging of the combustion cylinder. The said piston is connected on the one side with the piston 37 of the combustion engine, and on the other side with a guide piston 39, in which latter is provided the pin 41 connecting the said piston with a crank on the crank shaft 17 by means of the connecting rod 40. In its one end the crank shaft is preferably provided with a fly wheel 18 and on its other end with a toothed wheel 19 to drive the cam shaft 22, Fig. 4, connected to the crank shaft by means of the shaft 20 and the toothed gearing 21, said cam shaft having arranged thereon the cam disks 23 and 24 to control the valve openings provided in the one end of the combustion cylinder by means of the valves $a$ and $b$. The movement of the cam disks is transmitted to the said valves by means of the two-armed levers 25 and 26 respectively. On the same shaft there is also provided a cam disk to control the fuel valve 14 by means of the two-armed lever 27.

The air is supplied to the compressor 8 in the precompressed condition, the air being prior to this caused to pass a fan, turbine-compressor or the like 49, which may be driven in any suitable or preferred manner. Moreover, this air is cooled prior to being supplied to the compressor through the pipe 42, the same being caused to pass a number of pipes 28 arranged in a cooling apparatus 50, about which pipes cooling water is caused to circulate, such water being supplied to and delivered from the apparatus through the pipes 54. Pipe 42 opens into a distributing chamber 29 having the two suction valves 44 and 44' arranged therein, said valves bringing the working spaces on both sides of the compressor piston into connection with said chamber. Thus, cooled air of a certain pressure is introduced into the compressor through the said valves, which air, on having been compressed and passing the pressure valves 45 and 45' as well as the conduits 46 and 46' is conducted to the openings 47 provided in the cylinder wall in the lower part of the combustion cylinder and also, through the conduit 55, to the valve chamber for the valve $a$ arranged in the upper end of the combustion cylinder.

Figure 8:
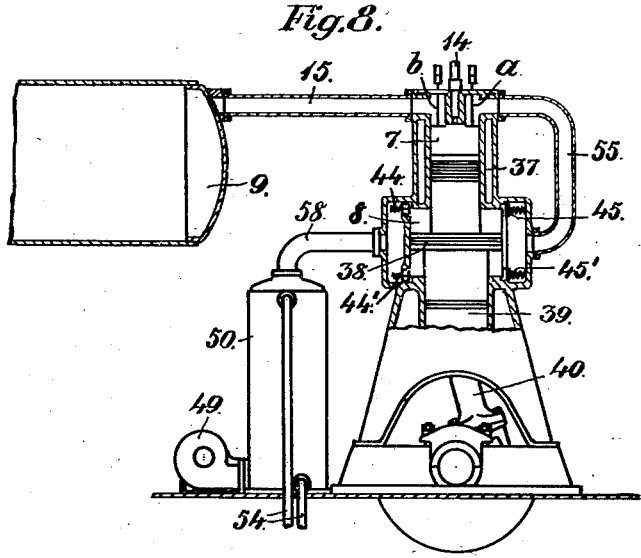

In the embodiment shown, air of a certain pressure is thus supplied to the working space of the combustion engine through the openings 47 provided in the cylinder wall and controlled by the upper edge of the piston 37, as well as through the valve opening controlled by the valve $a$ by means of the cam disk 23, whereas the gas produced is led off for consumption through the valve opening controlled by the valve $b$ by means of the cam disk 24 and through the conduit 15 connected to the latter valve opening, which conduit also is preferably provided with a container or the like 9, as shown in Fig. 8.

Referring to the periods indicated in Figs. 1 and 5, the pistons 37 and 38 at the point 36 assume the positions shown in Fig. 3, compressed air then flowing into the combustion cylinder through the openings 47 uncovered by the piston 37, so that the exhaust gases, while being mixed with the air, are driven to the pipe 15 through the valve opening uncovered by the valve $b$ by means of the cam 24. When the upwardly moving piston 37 in the course of its continued displacing of air and exhaust gases, and while compressing air on the upper side and sucking in air on the lower side of the compressor piston 38, has reached the point 35', the openings 47 are closed by the piston, whereby the induction of air this way is interrupted. At this point, or before, the valve $a$, however, opens through the action of the regulating cam 23 thereon, so that air may in this way flow into the combustion cylinder. When the piston has reached the point 31, the induction of air and the exhaust of gases will cease, the valves $a$ and $b$ being so adjusted by means of the cams 23 and 24 that they will both close at this point, whereupon compression of the air supplied into the cylinder will take place during the period 31—32. At the upper return point of the piston, the air compression has been completed on the upper side of the compressor piston 38, and the compressed air has escaped through the pressure valve 45 to the pipe system 55, 46 and 46' formed into an air container, whereas cooled air precompressed on the lower side of the compressor piston has been introduced through the suction valve 44' so as to entirely fill up the space underneath the piston.

During the downward movement of the piston, fuel is introduced into the combustion cylinder during the period 32—33, inasmuch as the cam provided on the cam shaft 22 is adapted for this purpose to actuate the fuel valve 14 by means of the arm 27. By reason of the high air temperature prevailing in the cylinder, the quantity of fuel supplied will then be combusted while developing power. During the said period, cooled precompressed air has commenced to flow in on the upper side of the compressor system, through the suction valve 44, while compression of the previously received air quantity has commenced on the lower side of the piston. During the continued downward movement of the piston, expansion takes place in the period 33—34, which is interrupted at the last-mentioned point, in that the exhaust valve $b$ is caused to open by means of the cam 24. A small equalization of pressure may then, perhaps, take place, in that the gases through the valve $b$ commence to escape to the conduit 15, which should be completed at the point 35, where the openings 47 in the cylinder wall begin to be uncovered by the piston 37, whereby compressed air begins to flow from the container 55, 46 and 46' into the cylinder, for the purpose of scavenging the latter, past the valve $b$. The scavenging through the said openings takes place, until the upwardly moving piston has reached the point 35', as stated hereinbefore. At the lower return point of the piston, the precompressed air on the upper side of the compressor piston 38 has filled up all of the volume above this piston through the valve 44, whereas on the lower side of the piston the compression of the air has been completed and the compressed air supplied to the pipe system 46', 46 and 55 through the pressure valves 45', from which pipe system the required amount of air is obtained for scavenging through the openings 47 and, later on, through the openings controlled by the valve $a$.

The cams arranged on the cam shaft 22 thus control the valves 14, $b$ and $a$ in such a manner that the fuel valve 14 is kept open during the period 32—33, the exhaust valve $b$ being kept open during the period 34—31 and the fresh air valve $a$ during the period 35'—31. That portion of the air quantity received in the cylinder, which is used for charging, is constituted by the amount of air present in the combustion cylinder at the point 31 at the end of the scavenging operation. The amount of this air is thus mainly dependent on the position of said point in the course of the piston stroke, that is to say, on the moment when compression commences, which point is, in turn, determined by the adjustment of the cams 23 and 24 with respect to the amount of air required for combustion and by the temperature assumed by the charging air upon introduction into the combustion cylinder. This temperature is higher than $T_L$, and for this reason the relation between the weight of the compressor air, and the quantity by weight which for complete scavenging is used for charging of the combustion cylinder, is greater than the ratio of the volume $m:x$ (according to Figs. 1 and 2). If $m$ is equal to $1.5x$, the amount of air received in the compressor will thus be 50% larger than the quantity of the same air remaining as charging air in the working space of the combustion engine.

The compressor can also, as shown in Fig. 6, be so designed that all the requisite air is sucked in at 42 above the compressor piston and, after compression there and an eventual cooling in a cooler 48 by conveying the air through the valve 45 and pipe 56 to the cooler 48 and from there through the pipe 57 and valve 52, conducted to the other side of same piston to be further compressed up to the scavenging pressure. This scavenging air is then conducted through the valve 53 and pipe 55 to valve $a$ into the cylinder 7. Such a design will however become more expensive and cause losses both by contraction of the air in the valves and by friction on account of the volume of the stroke necessarily being made larger. Nevertheless, said design may in special cases be of use, especially when a particularly low temperature of the gas mixture is desired even at the expense of a somewhat lowered pressure of the mixture.

The valves $a$ and $b$ are operated in a known manner by means of suitable gears from the main shaft, for instance in a manner similar to that shown in Fig. 4.

The compressor can also be single acting, as shown in Fig. 7, for compression direct to the gas pressure but this design will be inferior to that of the double-acting compressor, which latter admits of a smaller diameter of the piston.

If the two-stroke engine, as shown in Fig. 7, is built together with a single-acting compressor with the working chamber on the lower side of the compressor piston this advantage is obtained that an alternating pressure appears in the bearings and also that a better equalization of the piston pressure results on account thereof that the compression in the compressor cylinder takes place during the same stroke as the expansion in the combustion chamber. The space on the upper side communicates continuously with the atmosphere through apertures 51. The atmospheric air is in this case sucked in through a fan-blower 49 and cooled in a cooler 50 by means of cold water through the pipes 54 before introduced in the compressor through a pipe 58 and a valve 44, the construction of the blower and cooler being preferably similar to that shown in Fig. 3. The compressed air is conducted through a valve 45 and pipe 55 to the inlet valve $a$.

In Fig. 8, is shown a similar plant as in Fig. 3, thus consisting of a double-acting compressor piston built together with the piston of the combustion engine and compressing the air in one stage on both sides, the compressor being connected by means of a pipe 55 to the inlet valve $a$ of the piston engine. In this case the inlet ports 47 of Fig. 3 are dispensed with and the scavenging taking place only through the valve $a$.

For a considerable raising of the gas pressure or a considerable lowering of its temperature the plant can as already described for Fig. 7 preferably be completed with the separately driven fan blower 49 or the like and a cooling apparatus 50 for raising the pressure $p_0$ some per cent above atmosphere. The weight of the air supplied by the compressor can thereby be raised quite considerably.

For a machine as described the following data can preferably be used: a combustion pressure of 850 lbs. per square inch, a gas mixture with a pressure of 57 lbs. per square inch above atmosphere, a temperature of 750° F., the stroke volume of the compressor being of such a size as compared with the stroke volume of the combustion engine that the total quantity of air sucked by the compressor and which after being compressed to the required pressure is supplied to the working cylinder of the engine during the scavenging period is about 50% larger than the quantity of the same air which will remain, after the scavenging period, as charging air in said working cylinder.

The gas mixture generated can then be utilized in a common steam engine, rotary engine or turbine.

Having thus described my invention I claim as follows:

1. In a generator plant for producing a gas mixture, an internal combustion piston engine, an air compressor directly driven by said engine, means for admitting the air compressed by the compressor into the cylinder of said engine, and exhaust means opening at the end of the expansion stroke when the pressure of the expanded gas is approximately the same as the pressure of the air compressed by the compressor, the stroke volume of the compressor being such relative to the stroke volume of the combustion engine that the total quantity of the air sucked by the compressor and supplied when compressed to the cylinder of the combustion engine is at least fifty per cent larger than the quantity of the same air which will remain, after the scavenging period, in the said cylinder for charging.

2. In a generator plant for producing a gas mixture, a two-stroke internal combustion engine, an air compressor directly driven by said engine, means for admitting the air compressed by the compressor into the cylinder of said engine, and exhaust means opening at the end of the expansion stroke when the pressure of the expanded gas is approximately the same as the pressure of the air compressed by the compressor, the stroke volume of the compressor being such relative to the stroke volume of the combustion engine that the total quantity of the air sucked by the compressor and supplied when compressed to the cylinder of the combustion engine is at least fifty per cent larger than the quantity of the same air which will remain, after the scavenging period, in the said cylinder for charging.

3. In a generator plant for producing a gas mixture, an internal combustion piston engine, an air compressor directly driven by said engine, the piston of the combustion engine and the piston of the compressor being built together and connected to a crank rod common to both, means for admitting the air compressed by the compressor into the cylinder of said engine, and exhaust means opening at the end of the expansion stroke, the pressure of the expanded gas at such time being approximately the same as the pressure of the air compressed by the compressor, the stroke volume of the compressor being such relative to the stroke volume of the combustion engine that the total quantity of the air sucked by the compressor and supplied when compressed to the cylinder of the combustion engine is at least fifty per cent larger than the quantity of the same air which will remain, after the scavenging period, in the said cylinder for charging.

4. In a generator plant for producing a gas mixture, a two-stroke internal combustion engine, an air compressor directly driven by said engine, inlet ports in the wall of the combustion cylinder controlled by the engine piston and adapted to admit the air compressed by the compressor into said cylinder, and an outlet valve located in the cover of the combustion cylinder and adapted to open at the end of the expansion stroke when the pressure of the expanded gas is approximately the same as the pressure of the air compressed by the compressor, the stroke volume of the compressor being such relative to the stroke volume of the combustion engine that the total quantity of the air sucked by the compressor and supplied when compressed to the cylinder of the combustion engine is at least fifty per cent larger than the quantity of the same air which will remain, after the scavenging period, in the said cylinder for charging.

5. In a generator plant for producing a gas mixture, a two-stroke internal combustion engine, an air compressor directly driven by said engine, inlet ports in the wall of the combustion cylinder controlled by the engine piston, a mechanically operated inlet valve located in the cover of the combustion engine cylinder, a pipe between said compressor and said ports and valve for conducting the air compressed by the compressor into said cylinder, a mechanically operated outlet valve also located in the cover of the combustion cylinder and means for opening said valve at the end of the expansion stroke, the pressure of the expanded gas at such time being approximately the same as the pressure of the air compressed by the compressor, the stroke volume of the compressor being such relative to the stroke volume of the combustion engine that the total quantity of the air sucked by the compressor and supplied when compressed to the cylinder of the combustion engine is at least fifty per cent larger than the quantity of the same air which will remain, after the scavenging period, in the said cylinder for charging.

6. In a generator plant for producing a gas mixture, a two-stroke internal combustion engine, an air compressor driven by said engine, the piston of the combustion engine and the piston of the compressor being built together and connected to a crank rod common to both, an inlet valve located in the cover of the combustion engine cylinder and adapted to admit the air compressed by the compressor into said cylinder, an outlet valve also located in the cover of said cylinder, and means for opening said valve at the end of the expansion stroke, the pressure of the expanded gas at such time being approximately the same as the pressure of the air compressed by the compressor, the stroke volume of the compressor being such relative to the stroke volume of the combustion engine that the total quantity of the air sucked by the compressor and supplied when compressed to the cylinder of the combustion engine is at least fifty per cent larger than the quantity of the same air which will remain, after the scavenging period, in the said cylinder for charging.

7. In a generator plant for producing a gas mixture, a two-stroke internal combustion engine, an air compressor driven by said engine, the piston of the combustion engine and the piston of the compressor being built together and connected to a crank rod common to both, inlet ports in the wall of the combustion cylinder controlled by the engine piston, a mechanically operated inlet valve located in the cover of the combustion engine cylinder, a pipe between said compressor and said ports and valve for conducting the air compressed by the compressor into said cylinder, a mechanically operated outlet valve also located in the cover of the combustion cylinder, and means for opening said valve at the end of the expansion stroke, the pressure of the expanded gas at such time being approximately the same as the pressure of the air compressed by the compressor, the stroke volume of the compressor being such relative to the stroke volume of the combustion engine that the total quantity of the air sucked by the compressor and supplied when compressed to the cylinder of the combustion engine is at least fifty per cent larger than the quantity of the same air which will remain, after the scavenging period, in the said cylinder for charging.

8. In a generator plant for producing a gas mixture an internal combustion piston engine, an air compressor driven by said engine, said compressor being double-acting and built to compress air directly up to the pressure of the generated gas on each side of its piston means for admitting the air compressed by the compressor into the cylinder of said engine, exhaust means, and means for opening said exhaust means at the end of the expansion stroke, the pressure of the expanded gas at such time being approximately the same as the pressure of the air compressed by the compressor, the stroke volume of the compressor being such relative to the stroke volume of the combustion engine that the total quantity of the air sucked by the compressor and supplied when compressed to the cylinder of the combustion engine is at least fifty per cent larger than the quantity of the same air which will remain, after the scavenging period, in said cylinder for charging.

9. In a generator plant for producing a gas mixture, an internal combustion piston engine, an air compressor driven by said engine, means for precompressing the air before admitting it to said compressor, means for admitting the air compressed by the compressor into the cylinder of said engine, exhaust means, and means for opening said exhaust means at the end of the expansion stroke, the pressure of the expanded gas at such time being approximately the same as the pressure of the air compressed by the compressor, the stroke volume of the compressor being such relative to the stroke volume of the combustion engine that the total quantity of the air sucked by the compressor and supplied when compressed to the cylinder of the combustion engine is at least fifty per cent larger than the quantity of the same air which will remain, after the scavenging period, in the said cylinder for charging.

10. In a generator plant for producing a gas mixture, an internal combustion piston engine, an air compressor driven by said engine and substantially consuming the available power output of the engine, means for cooling the air before admitting it to said compressor, means for admitting the air compressed by the compressor into the cylinder of said engine, and exhaust means, and means for opening said exhaust means at the end of the expansion stroke, the pressure of the expanded gas at such time being approximately the same as the pressure of the air compressed by the compressor, the stroke volume of the compressor being such relative to the stroke volume of the combustion engine that the total quantity of the air sucked by the compressor and supplied when compressed to the cylinder of the combustion engine is at least fifty per cent larger than the quantity of the same air which will remain, after the scavenging period, in said cylinder for charging.

11. In a generator plant for producing a gas mixture, an internal combustion piston engine, an air compressor driven by said engine and substantially consuming the available power output of the engine, means for precompressing and cooling the air before admitting it to said compressor, means for admitting the air compressed by the compressor into the cylinder of said engine, exhaust means, and means for opening said exhaust means at the end of the expansion stroke, the pressure of the expanded gas at such time being approximately the same as the pressure of the air compressed by the compressor, the stroke volume of the compressor being such relative to the stroke volume of the combustion engine that the total quantity of the air sucked by the compressor and supplied when compressed to the cylinder of the combustion engine is at least fifty per cent larger than the quantity of the same air which will remain, after the scavenging period, in said cylinder for charging.

12. In a generator plant for producing a gas mixture, an internal combustion piston engine, an air compressor driven by said engine and substantially consuming the available power output of the engine, means for precompressing and cooling the air before admitting it to said compressor, the latter being double-acting and compressing said precompressed and cooled air up to the pressure of the generated gas on each side of its piston, means for admitting the air compressed by the compressor into the cylinder of said engine, exhaust means, and means for opening said exhaust means at the end of the expansion stroke, the pressure of the expanded gas at such time being approximately the same as the pressure of the air compressed by the compressor, the stroke volume of the compressor being such relative to the stroke volume of the combustion engine that the total quantity of the air sucked by the compressor and supplied when compressed to the cylinder of the combustion engine is at least fifty per cent larger than the quantity of the same air which will remain, after the scavenging period, in said cylinder for charging.

13. In a generator plant for producing a gas mixture, an internal combustion piston engine, an air compressor driven by said engine and substantially consuming the available power output of the engine, the piston of the combustion engine and the piston of the compressor being built together and connected to a crank rod common to both, means for precompressing and cooling the air before admitting it to said compressor, the latter being double-acting and compressing said precompressed and cooled air up to the pressure of the generated gas on each side of its piston, means for admitting the air compressed by the compressor into the cylinder of said engine, exhaust means, and means for opening said exhaust means at the end of the expansion stroke, the pressure of the expanded gas at such time being approximately the same as the pressure of the air compressed by the compressor, the stroke volume of the compressor being such relative to the stroke volume of the combustion engine that the total quantity of the air sucked by the compressor and supplied when compressed to the cylinder of the combustion engine is at least fifty per cent larger than the quantity of the same air which will remain, after the scavenging period, in said cylinder for charging.

14. In a generator plant for producing a gas mixture, an internal combustion piston engine, an air compressor driven by said engine and substantially consuming the available power output of the engine, means for admitting the air compressed by the compressor into the cylinder of said engine, and exhaust means opened at the end of the expansion stroke, the pressure of the expanded gas at such time being approximately the same as the pressure of the air compressed by the compressor, the latter being of proper capacity to supply compressed air to the combustion engine cylinder in such quantity that the temperature of the generated gas mixture will lie between about 550 and 1100° F.

15. In a generator plant for producing a gas mixture, an internal combustion piston engine, an air compressor driven by said engine and substantially consuming the available power output of the engine, means for cooling the air, means for conducting said cooled air to the said compressor, means for admitting the air compressed by the compressor into the cylinder of said engine, and exhaust means opened at the end of the expansion stroke, the pressure of the expanded gas at such time being approximately the same as the pressure of the air compressed by the compressor, the latter being of proper capacity to supply compressed air to the combustion engine cylinder in such quantity that the temperature of the generated gas mixture will lie between about 550 and 1100° F.

In testimony whereof I affix my signature.
JOHAN ERIK JOHANSSON.